United States Patent
Akers

(10) Patent No.: US 9,749,211 B2
(45) Date of Patent: Aug. 29, 2017

(54) DETECTING NETWORK-APPLICATION SERVICE FAILURES

(75) Inventor: David R. Akers, Los Gatos, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 1527 days.

(21) Appl. No.: 13/027,288

(22) Filed: Feb. 15, 2011

(65) Prior Publication Data

US 2012/0209985 A1     Aug. 16, 2012

(51) Int. Cl.
G06F 15/173     (2006.01)
H04L 12/26      (2006.01)

(52) U.S. Cl.
CPC ................... H04L 43/50 (2013.01)

(58) Field of Classification Search
CPC . H04L 12/2697; H04L 43/50; H04L 63/0227; H04L 43/045; H04L 41/5035; H04L 43/08; H04L 41/0631; H04L 12/585; H04L 51/12; H04L 12/2602
USPC ........................................... 709/224
See application file for complete search history.

(56) References Cited

U.S. PATENT DOCUMENTS

| | | | |
|---|---|---|---|
| 5,974,576 A | 10/1999 | Zhu | |
| 6,314,512 B1 | 11/2001 | Branson et al. | |
| 6,397,355 B1 | 5/2002 | Curtis et al. | |
| 6,631,408 B1 * | 10/2003 | Welter et al. ................. | 709/223 |
| 6,801,940 B1 | 10/2004 | Moran | |
| 6,839,872 B2 * | 1/2005 | Kohda ................ | H04L 12/2697 370/245 |
| 6,865,692 B2 * | 3/2005 | Friedman et al. .............. | 714/25 |
| 6,883,120 B1 | 4/2005 | Banga | |
| 7,243,267 B2 | 7/2007 | Klemm et al. | |
| 2002/0124110 A1 * | 9/2002 | Tanaka .................... | H04L 12/24 709/246 |
| 2003/0061286 A1 * | 3/2003 | Lin ............................... | 709/205 |
| 2004/0006447 A1 * | 1/2004 | Gorin ........................... | 702/181 |
| 2007/0258382 A1 * | 11/2007 | Foll ..................... | H04L 12/2602 370/252 |
| 2008/0025332 A1 | 1/2008 | Wang | |
| 2009/0013374 A1 * | 1/2009 | Tsai ...................... | H04L 12/585 726/1 |
| 2009/0190468 A1 | 7/2009 | Gillot | |

(Continued)

OTHER PUBLICATIONS

Reilly, Denis et al., "Middleware-Based Failure Detection and Recovery Services for Fault-Tolerant E-services", Dec. 14, 2009, pp. 448-453 http://ieeexplore.ieee.org/Xplore/login.jsp?url=http%3A%2F%2Fieeexplore.ieee.org%2Fiel5%2F5394474%2F5395080%2F05395173.pdf%3Farnumber%3D539517&authDeci.

(Continued)

*Primary Examiner* — SM Rahman

(74) *Attorney, Agent, or Firm* — Mannava & Kang, P.C.

(57) ABSTRACT

A computer-implemented process for detecting service failures of a network application under test involves collecting raw network-application availability monitoring (NAAM) data. The NAAM data can include datapoints, each which specifies the network application under test, a respective test site; a time corresponding to a respective probe, and an indication whether the respective probe resulted in a success or a failure. The raw NAAM data is filtered to remove datapoints indicating failures associated with causes other than a service failure of the NAUT. The filtered NAAM data is analyzed to detect a service failure of the NAUT.

14 Claims, 6 Drawing Sheets

(56) References Cited

U.S. PATENT DOCUMENTS

2010/0150318 A1* 6/2010 Irenze ............... H04L 12/2697
379/21
2010/0223499 A1 9/2010 Panigrahy et al.

OTHER PUBLICATIONS

Lo, David et al., "Classification of Software Behaviors for Failure Detection: a Discriminative Pattern Mining Approach", Jun. 28, 2009 http://www.cs.uiuc.edu/homes/hanj/pdf/kdd09$_{13}$ dlo.pdf.
Venkatasubramanian, Venkat et al., "A Review of Process Fault Detection and Diagnosis Part I: Quantitative Model-Based Methods" Computers and Chemical Engineering, 27 (2003) pp. 293-311 http://www.ece.lsu.edu/mcu/lawss/add_materials/FaultDetectionPart1.pdf.

* cited by examiner

| GENE TABLE 900 | | |
|---|---|---|
| GENE | TALLY | % |
| AAA | - | - |
| AAa | - | - |
| AaA | - | - |
| aAA | - | - |
| Aaa | - | - |
| aAa | - | - |
| aaA | - | - |
| aaa | - | - |
| BBB | - | - |
| BBb | - | - |
| BbB | - | - |
| bBB | - | - |
| Bbb | - | - |
| bBb | - | - |
| bbB | - | - |
| bbb | - | - |
| CCC | - | - |
| CCc | - | - |
| CcC | - | - |
| cCC | - | - |
| Ccc | - | - |
| cCc | - | - |
| ccC | - | - |
| ccc | - | - |

FIG. 9

| GENE-TYPE TABLE 1000 | | |
|---|---|---|
| GENE | TALLY | % |
| XXX | - | - |
| XXx | - | - |
| XxX | - | - |
| xXX | - | - |
| Xxx | - | - |
| xXx | - | - |
| xxX | - | - |
| xxx | - | - |

FIG. 10

DETECTING NETWORK-APPLICATION SERVICE FAILURES

BACKGROUND

Network application availability monitoring (NAAM) is used to confirm, the continued availability of network applications, e.g., web-server applications, and to identify periods in which a network application is unavailable. NAAM can be useful to businesses in evaluating the uptime performance of a network application, as well as in serving as a warning system for problems that may need to be addressed.

NAAM may involve repeated probing of a host site by a test site. The test site may repeatedly (e.g., every five or ten minutes) issue a probe sequence corresponding to a series of actions a client, e.g., customer, might take. NAAM result data can include datapoints, each of which identifies the network application under test (NAUT), the time the probe was issued, and the outcome (success versus failure) of the probe.

NAAM result data can be collected, at multiple test sites to help distinguish test-site failures from network-application service failures. NAAM datapoints can be collected from the test sites and analyzed to identify times associated with NAUT service failure. For example, durations, in which the percentage of NAAM datapoints indicating failure exceeds some threshold, can be used to identify service failures.

BRIEF DESCRIPTION OF THE DRAWINGS

The following figures represent examples or implementations of the invention and not the invention itself.

FIG. 9 is an example of a NAAM gene table.

FIG. 10 is an example of a NAAM gene-type table.

DETAILED DESCRIPTION

Figure 1:
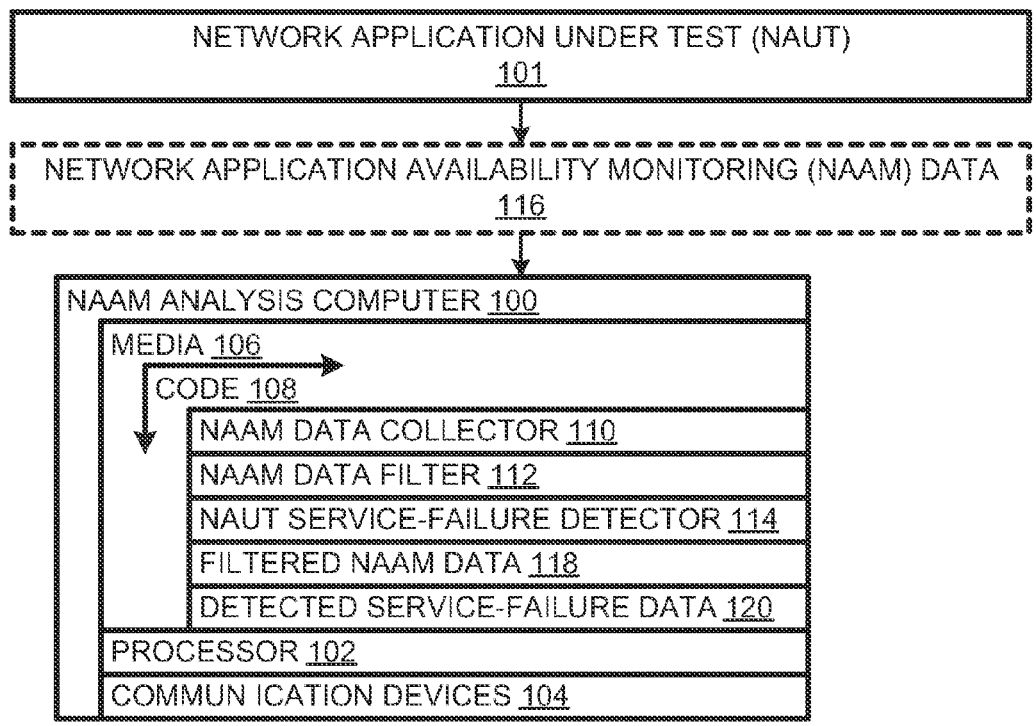
FIG. 1 is a schematic diagram of an example of a NAAM analysis system.
Figure 2:
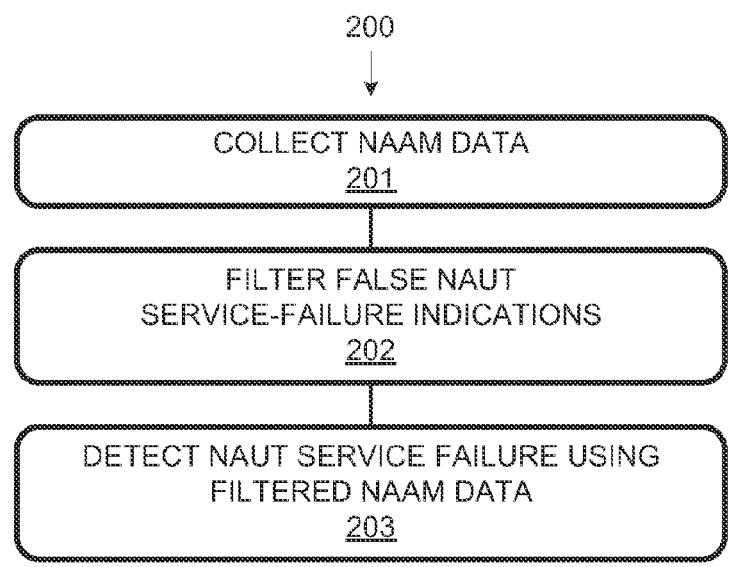
FIG. 2 is a flow chart of a NAAM analysis process implemented in the system of FIG. 1.

A NAAM data analysis computer 100, shown in FIG. 1, filters false indications of service failures to provide filtered (reduced-noise) NAAM data, which can yield more accurate identifications of service failures (periods of unavailability) of a network application under test (NAUT) 101. To this end, computer 100 includes a processor 102, communications devices 104, and computer-readable storage media 106. Media 106 is encoded with code 108 that, when executed by processor 102, defines a NAAM data collector 110, a NAAM data filter 112, and a service-failure detector 114. These functional components cooperate to implement a process 200, flow charted in FIG. 2, including: at 201, collecting NAAM data 116; at 202, filtering NAAM data to, in effect, remove false indications of NAUT service failures to yield filtered NAAM data 118, and analyzing at 203 the filtered data to detect time periods 120 service failures NAUT 101.

Figure 3:
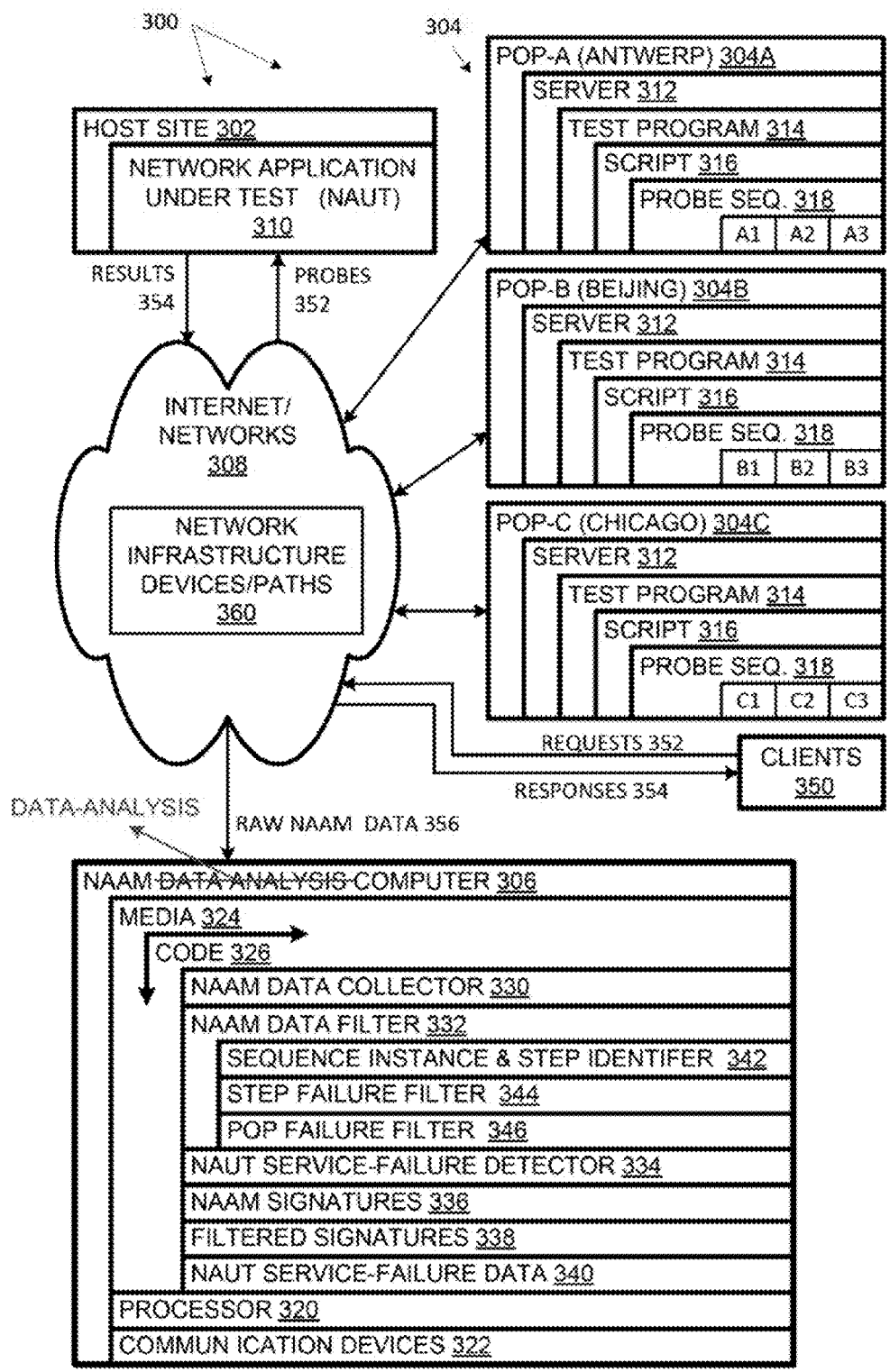
FIG. 3 is an example of a system including a NAAM analysis computer.

A network system 300, shown in FIG. 3, includes a host site 302, "point-of-presence" (POP) test sites 304, a NAAM data-analysis computer 306, and networks 308, including the Internet. Host site 302 includes a network application under test (NAUT) 310. Typically, a NAUT is an application used by clients that access host site 302. The continuous availability of NAUT 310 may be important for one or more reasons such as profitability (e.g., a direct sales application), criticality (e.g., the NAUT provides warning services), or credibility (e.g., users may elect not to use an email service that is often unavailable). In addition to a NAUT, a host site can include other applications upon which the NAUT depends for availability. For example, NAUT 310 can be a database, which depends on application, web, and batch tiers for availability.

In various examples, a host site may include one, two, or more, e.g., hundreds, of NAUTs. In various examples, a NAUT may run on a single stand-alone computer, on a computer module (e.g., blade), on a partition of a computer, or on multiple computers or computer modules. In the case of multiple computers or modules, they may be co-located, e.g., within the same room or building, or distributed across venues, e.g., different buildings, cities, states, countries, or continents.

POP test sites 304 include POP test sites 304-A, 304-B, and 304-C; for mnemonic purposes, the respective locations for these sites are indicated as Antwerp, Beijing, and Chicago. Each test site serves as an instrument for monitoring NAUT 310 for service failures. In general, there can be one to hundreds of test sites, with greater numbers making it easier to distinguish test-site failures from NAUT failures. Having geographically diverse test sites also minimizes common sources of error due to shared network infrastructure path elements (e.g., switches and routers). Other factors to consider in selecting test sites are the locations of assets by the entity responsible for the testing, and the relative importance of locations (e.g., in terms of numbers of clients) at which test sites are to be placed.

Test sites 304 include hardware and software, which may differ among test sites. However, each test site 304-A, 304-B, and 304-C includes a server 312, and a test program 314 running on the respective server. Each test program 314 is designed to repeatedly execute a respective script 316 that causes a sequence 318 of probes to be transmitted to NAUT 310. Each probe can correspond to a request that a client might make. For example, each execution instance of script 316 corresponds to a respective sequence of probes in turn corresponding to a series of actions designed to 1) open a home page; 2) log in, and 3) select an item. In FIG. 3, each probe is indicated by a combination of a test-site letter identifier (e.g., A, B, or C) and a probe number (e.g., 1, 2, or 3) in the respective instance of probe sequence 318. For examples with larger numbers of test sites and/or with longer probe sequences, longer text strings can be used for identification.

NAAM data-analysis computer 306 includes a processor 320, communications (including input/output) devices 322, and non-transitory computer-readable storage media 324. Media 324 is encoded with code 326 corresponding to data including program instructions. The data instructions interact with computer hardware including processor 320 to define a NAAM data collector 330, a NAAM data filter 332, and a NAUT detector 334. In addition, code 326 defines non-instruction data including collected NAAM data in the form of signatures 336, filtered NAAM data 338, and NAUT service-failure data 340. NAAM data filter 332 includes a sequence instance and step identifier 342, a step failure filter 344, and a POP failure filter 346. Herein, "computer" is a nestable term so that, for example, one computer can serve as a NAAM data collector 330, while another can provide for filter 332 and detector 334.

During normal operation, clients 350 interact with NAUT 310 by making requests 352 and receiving responses 354. Also during normal operation, test sites 304 transmit probes 356 to NAUT 310, which returns corresponding results 358. In failure cases where no result is returned, the result can be a timeout at the test site that sent the probe; the timeout would be indicated as a failure datapoint. Results 358 are used to generate raw NAAM data 356, which the tests sites transmit to NAAM data analysis computer 306.

Raw NAAM data 356 is a batch or stream of datapoints. Each datapoint corresponds to a probe transmitted from a test site 304 to NAUT 310. Each datapoint specifies: 1) the test site that sent the probe; 2) the time the probe was sent; and 3) whether the result was a success or a failure. For the illustrated example, the raw datapoints do not explicitly specify host-site conditions (e.g., downtime due to schedule maintenance) and do not distinguish probe sequence positions (e.g., whether the probe is the first, second, or third probe in a sequence of three probes). in other examples, datapoints may specify values of other parameters.

While a datapoint of raw NAAM data 356 can distinguish between a success and a failure, it does not determine the source of is a failure. A probe can result in a failure for several reasons, e.g., 1) a failure of NAUT 310; 2) a failure of a front-end or other host-site program or of host-site hardware required to access NAUT 310; 3) a mismatch between a probe and NAUT 310 (for example, a failure can be indicated when a probe attempts to activate a link that has been removed from NAUT 310; 4) a failure at a test site; and 5) a failure of a network infrastructure device or path 360.

Figure 4A:
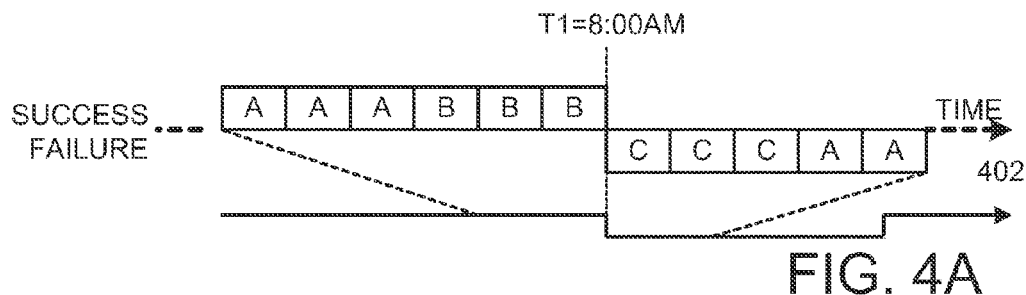
FIGS. 4A-4D are examples of NAAM signatures.

Ideally, the raw NAAM data would be as represented in FIG. 4A, which shows a series of raw datapoints ordered chronologically along line 402 according to the time the respective probes were transmitted. The illustrated datapoints represent three consecutive successful probes from test site 304A (FIG. 3), followed by three consecutive successful probes from test site 304B, followed by an unsuccessful probe from test site 304C, followed by a pair of unsuccessful probes from test site 304A. It is straightforward to identify a service failure of NAUT 310 at T1=8AM, since the probes transmitted earlier were uniformly successful and the probes transmitted later were uniformly unsuccessful.

Figure 4B:
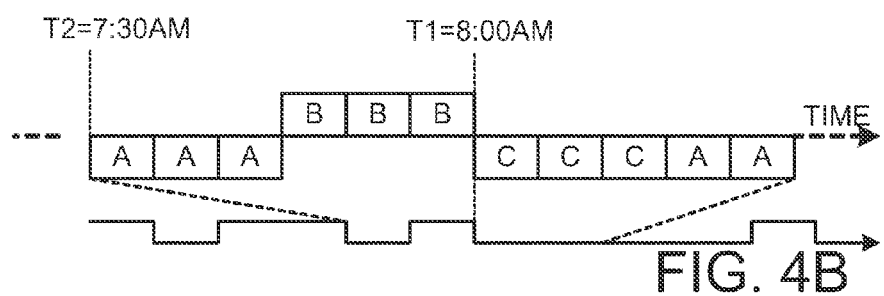

In reality, such clean identifications can be the exception rather than the rule. For example, FIG. 4B corresponds to a situation in which test site 304A is sending failure datapoints even when NAUT 310 is available. For example, test site 304A may have an IP range incorrectly specified in a proxy affecting probe-specific network traffic from test site 304A to host site 302, or return traffic from host site 302 to test site 304A; in that case, probes are transmitted or not transmitted to the address for NAUT 310 and the resulting timeouts are deemed probe failures. Depending on the algorithm used to detected NAUT failures, the NAUT failure may be deemed to have begun at 7:30 rather than 8:00, for example.

Figure 4C:
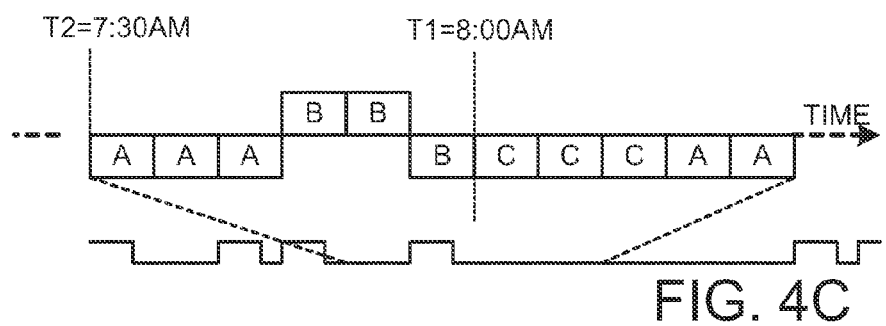

The task of detecting a NAUT service failure can be further complicated by step failures. For example, FIG. 4C shows the situation of FIG. 413 but with an additional systematic step failure in that the third step of every probe sequence is detected as a failure even when NAUT 310 is available. This may happen when a change in NAUT 310 renders the third probe obsolete, e.g., the probe calls for activating a link that is no longer presented by NAUT 310.

In this case, the onset of the NAUT service failure at 8:00 is even more difficult to identify.

Figure 4D:
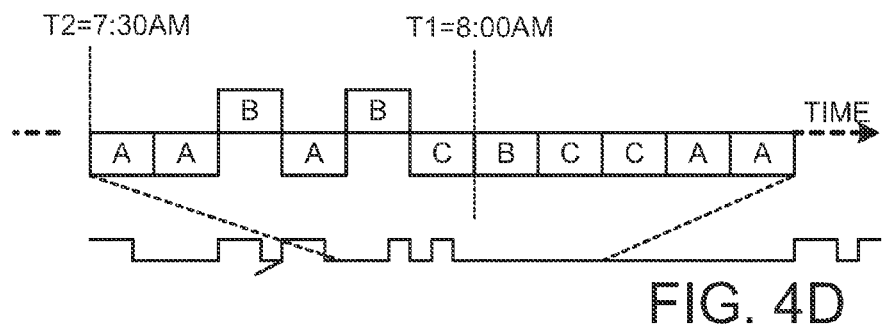

A further complication can result from. the asynchronous operation of tests sites 304. There is no guarantee that the datapoints corresponding to a probe sequence will appear consecutively. Thus, FIG. 4D shows some interleaving of datapoints from different test sites. For example, the two consecutive successful probes from test site 304B as show in FIG. 4C, are separated by an unsuccessful probe from test site 304A in FIG. 4D. Further complications can arise from problems associated with network infrastructure devices; such problems can affect some probes but not others from the same website; also, network infrastructure problems can affect some but not all test sites.

Figure 5:
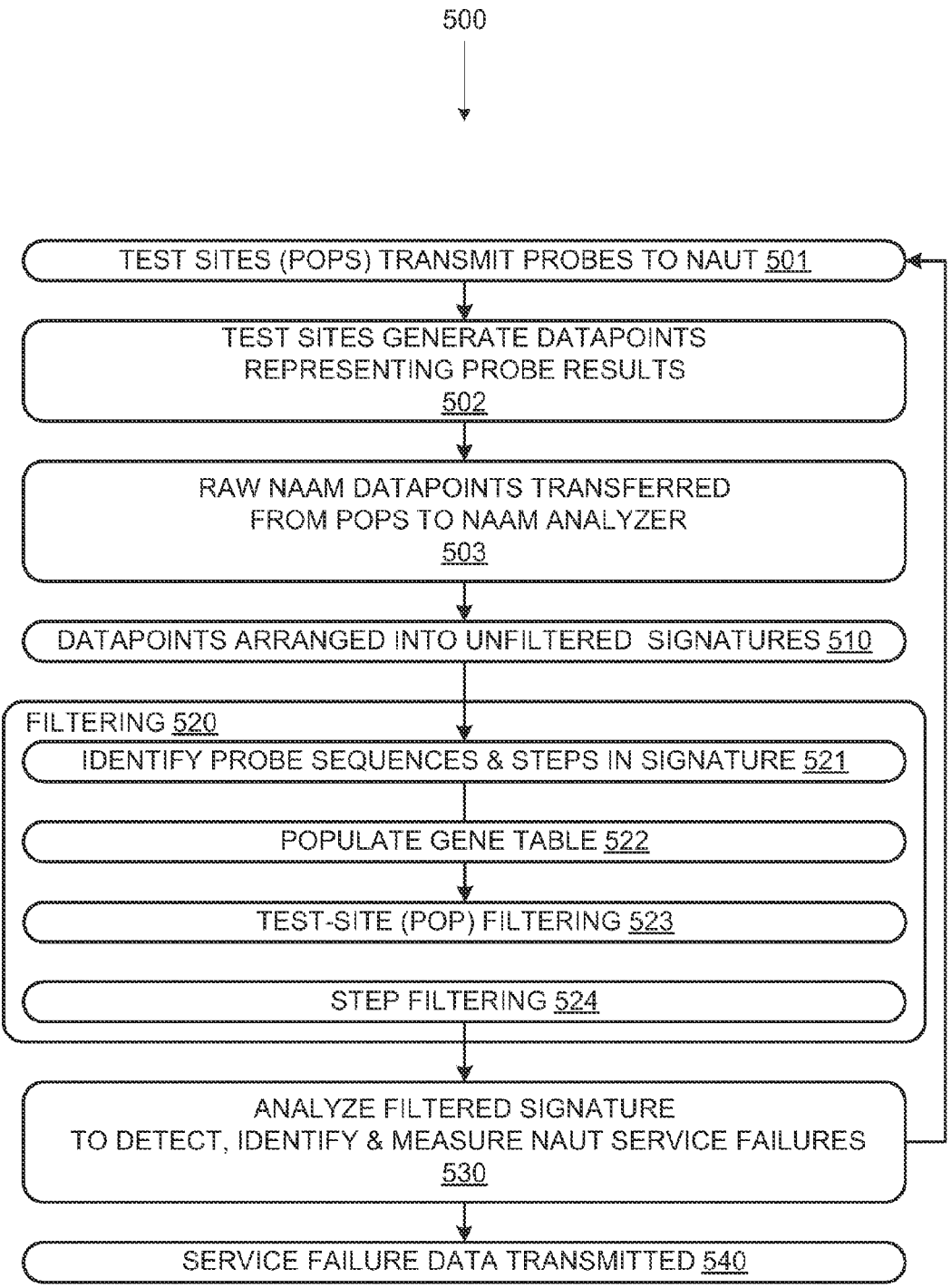
FIG. 5 is a flow chart of a NAAM analysis process implemented in the system of FIG. 3.

A challenge faced by NAAM data-analysis computer 306 is to make valid detections of NAUT service failures despite all these complications in the raw NAAM data 356. To this end, computer 306 implements process 500, flow-charted in FIG. 5. Preliminarily, at 501, test sites 304 transmit probes, e.g., automated requests, to NAUT 310. At 502, test sites 304 characterize probe results and generate NAAM data including datapoints. Each datapoint specifies the network application under test, the test site that sent the probe, the time the probe was sent, and whether the probe result was a success (the expected response was received) or a failure (an unexpected response or a timeout with no response). At 503, the NAAM data is transmitted to NAAM data-analysis computer 306; the transfer can be initiated by either the test sites or NAAM analysis computer 306.

At 510, NAAM data collector 330 collects raw NAAM data 356, organizing it and storing the organized data as collected NAAM data 336. In system 300, raw NAAM data 356 is streamed (i.e., sent as it is generated rather in batches) to computer 306. NAAM data collector 330 then divides or otherwise arranges the incoming data into groups of NAUT-over-time "signatures" for analysis.

For example, NAAM data collector 330 can organize incoming data into 6-hour signatures so that one signature can represent probes transmitted between 6AM and 12N on a particular day and the next from 12N to 6PM. Alternatively, shorter or longer signature durations can be used. Also, signatures may overlap, e.g., a signature extending from 6AM to 12N can be followed by a signature from 7AM to 1PM. In some variations, a sliding window technique is used so that the time period under consideration, in effect, slides forward in time, with older datapoints being retired as new ones come into consideration.

At 520, NAAM data filter 332 filters the collected NAAM data to yield filtered NAAM data 338. Process segment 520 can include several process segments of its own. At 521, a signature is analyzed to identify probe sequence instances and identify the sequence step to which each datapoint belongs. (Recall that NAAM datapoints of raw NAAM data 356 do not specify the sequence position of the corresponding probe.) This identification can be performed by considering the datapoints one test site at a time. For example, the datapoints for test site 304B might appear as in FIG. 7.

Figure 6:
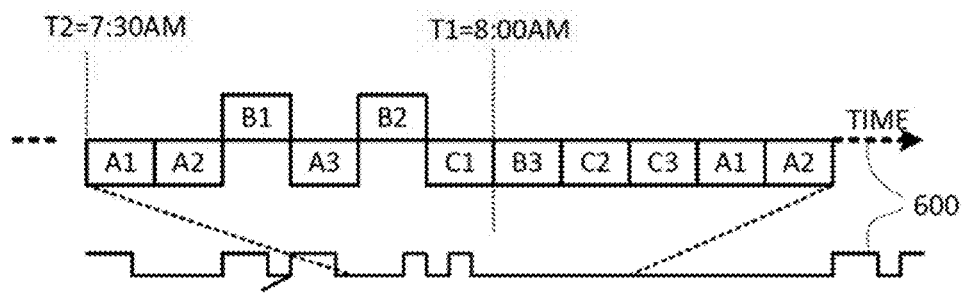
FIG. 6 is an example of a NAAM signature.
Figure 7:
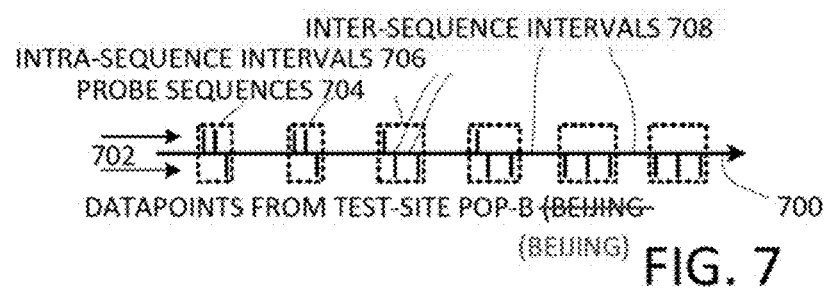
FIG. 7 is an example of a NAAM signature.

FIG. 7 depicts a time line 700 having a constant length to time ratio throughout (as opposed, for example, to FIG. 6 in which a chronologically ordered line 600 progresses in time from left to right, but not at a constant rate). It can be noted that datapoints 702 from the same sequence 704 occur closer in time to each other than do datapoints from different sequences. In other words, intra-sequence intervals 706 are shorter than inter-sequence intervals 708. Inter-sequence intervals 708 can be detected by scanning a signature and, considering one test site at a time, noting the magnitudes of the intervals between consecutive datapoints. Datapoints between successive inter-sequence intervals belong to the same probe sequence 704 or "gene"; the probe sequence instances for each test site can be identified. Note how the time-based gene definition tends to "disentangle" or "unintertwine" the asynchronous NAAM data.

Figure 8:
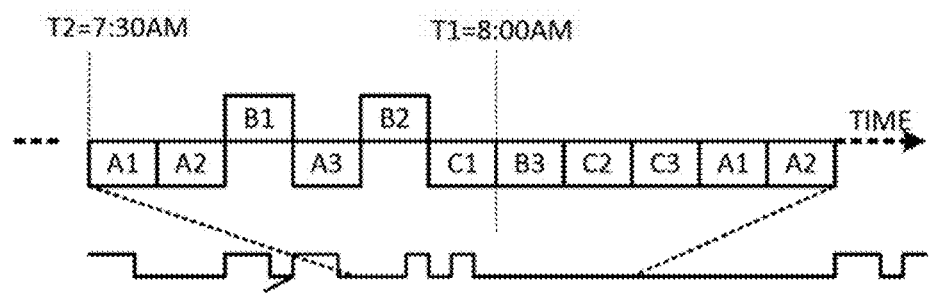
FIG. 8 is an example of a NAAM signature.

Tallying the number of datapoints from the same test site in an interval between successive inter-sequence intervals provides a count for the number of datapoints per probe sequence 704. This in turn permits steps to be assigned to each datapoint. FIG. 8 represents the same datapoints as FIG. 4D, but with steps identified as provided for at 521.

At 522 a "gene" list or table is populated with gene-frequency counts. Each gene corresponds to a probe sequence. Each step in the sequence can be assigned its own character or combination of characters. Upper case letters can be used to represent successes, while lower case letters can be used to represent failures on a per-step basis. For example, BbB represents a probe sequence of three probes for which the first and third were successful and the second resulted in failure. FIG. 9 depicts a gene table 900 for a three-probe sequence and three test sites (304A, 304B, and 304C).

At 523, test site filtering is performed. If the genes for one test site are predominantly, e.g., at least 90%, of an all-failure type, e.g., aaa, bbb, or ccc, but at least 50% of the other test sites are not predominantly failure genes, then the signature is deemed to suffer from a test-site failure. In the case of a test-site failure, the datapoints for that test site are removed from the signature. Alternatively, if all genes after a given time in a signature are failure genes, the datapoints for that test site after that time are removed from the signature. In effect, this removes noise due to test-site failures from the NAUT signal being analyzed, yielding a POP-filtered signature. In the illustrated examples, filtering is performed to remove datapoints corresponding to failures due to some but not all sources other than NAUT downtime; in other examples, filtering removes datapoints corresponding to all sources other than NAUT downtime.

At 524, step filtering is performed. Success/failure patterns are grouped across test sites using the data in gene table 900. in this case, the test-site designations are ignored so that, in effect, gene table 900 becomes a gene-type table 1000, as shown in FIG. 10. In gene-type table 1000, FIG. 10, success-failure patterns are considered irrespective of test site. Thus, instances of genes AaA, BbB, and CcC are treated as instances of a gene type XxX. The tally for a gene type is the sum of the tallies for the component genes. If one of the partial failure gene types (XXx, XxX, xXX, Xxx, xXx, xxX) predominates, e.g., at least 90% of the genes in an extended interval are of that gene type, a step failure is identified. In such a case, the datapoints corresponding to the failed step can be discarded from the signature, yielding a POP-and-step-filtered signature.

At 530, the POP and step-filtered signature is analyzed, e.g., by applying a ⅔ rule, in which an inter-sequence sized window is slid from earliest (left) to latest (right). Positions in which two thirds or more of the datapoints are "failures" are taken to indicate a service failure subject to a condition that a failure cannot begin or end at a successful datapoint. By applying such a rule to filtered data rather than unfiltered data, NAUT service failures and their associated onsets and endpoints can be identified more reliably. Process segments 501-530 are iterated to yield and analyze NAAM signatures, wherein each NAAM signature starts when its predecessor ends, or overlaps its predecessor.

Additional filtering may be applied after or before service failure detection at 530. For example, short (e.g., less than two minutes) periods of success between detected service failures may indicate a failed restart. In that case, the short interim can be ignored and the two detected service failures can be merged into a single longer service failure.

Process 500 is inherently adaptive since the number of steps in a probe sequence is determined from the NAAM data itself without using pre-defined patterns. if the number of steps in a probe sequence or the timing of a probe sequence is changed, process 500 can still determine the number of steps in a sequence and filter out test-site and systematic step failures.

Results are reported and transmitted at 540, e.g., to administrators to evaluate overall availability or to address causes of service failures. Since the filtered data is relatively free of false detections, the service failure detections are clean and relatively easy to interpret by non-technical managers and others without special training.

"NAAM", herein, is an abbreviation for "network-application availability monitoring". A "network application" is an application that can be accessed by clients over a network, e.g., the Internet. "Availability monitoring" refers to an activity of monitoring a network application to distinguish when it is available and when it is subject to a service failure and is, therefore, unavailable. Thus, availability monitors provides for evaluating the reliability of a NAUT and/or to detect problems compromising a NAUT's availability. "Raw" as used herein means "in a form prior to some explicitly described processing". "Raw" does not exclude some form of previous-processing.

Herein, a network application that is being monitored for availability is referred to as a "network application under test" or NAUT. A NAUT can be "available" in that it responds appropriately to client requests or subject to a service failure (i.e., "unavailable") in that it fails to respond appropriately to client requests. The failure may be planned (as in schedule maintenance) or unplanned (e.g., caused by an equipment failure).

Herein, a "test site" is a location including an instrument configured to send probes to a NAUT. The thing that is making the measurement and transmitting the data is an instrument. You can have many instruments at a site (for capacity); the site is a property of the instrument (which may be chosen to emulate customer experiences globally). Herein, multiple test sites in geographically diverse locations may send probes to a NAUT.

Herein, a "probe" is a request sent for test or monitoring purposes that mimics a request that a client might make in normal use of a NAUT. A probe sequence is a series of one or more probes. The probes of a multi-probe sequence typically represent different requests. A multi-probe sequence can be divided into "steps", each of which corresponds to a respective probe in the sequence. "Probe step number" corresponds to the position of a probe in a probe sequence. Different instances of a probe sequence can be transmitted by different test sites and by a given test site at different times. Each probe may have a result; when the result is the designed-for or expected result, a "success" may be indicated. When the result is not desired or absent, a "failure" may be indicated.

Herein, "analyzing" means "performing computations on" to yield some insight into the object being analyzed. Herein, the object of analysis can be NAAM data, e.g., as arranged in a signature. Herein, "filtering" means "modifying", typically by removal. For example, filtering NAAM data or a signature can involve removing datapoints that meet some criterion from the NAAM data or the signature.

A "datapoint" is a unit of data specifying values for plural parameters. Each datapoint herein is associated with a probe that was transmitted from a test site to a NAUT. Each such datapoint specifies the NAUT the probe was intended to be sent to, the test site transmitting the probe, the time the probe was transmitted, and the result (e.g., success vs. failure) of the probe. A "signature" is a temporally ordered arrangement of datapoints that can be used to characterize the availability of a NAUT.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer. "Display medium" and "display media" refer to storage media in which information is encoded in human-readable form. "Computer-readable" refers to storage media in which information is encoded in computer-readable form.

Herein, unless preceded by the word "virtual", "machine", "device", and "computer" refer to hardware or a combination of hardware and software. A "virtual" machine, device, or computer is a software analog or representation of a machine, device, or server, respectively, and not a "real" machine, device, or computer. A "server" is a real (hardware or combination of hardware and software) or virtual computer that provides services to computers. Herein, unless otherwise apparent from context, a functionally defined component (e.g., a collector, a filter, a detector, an analyzer) of a computer is a combination of hardware and software executing on that hardware to provide the defined functionality. However, in the context of code encoded on computer-readable storage media, a functionally-defined component can refer to software. A "computer-implemented process" is a process that is tied to a particular machine or set of machines in that the machine or machines are require to perform one or more elements of the process.

Herein, a "computer" is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phases "the center of said circle" indicates that the claims provide explicit antecedent basis for "circle", which also provides as implicit antecedent basis for "center" since every circle contains exactly one center. The illustrated and other described embodiments, as well as modifications thereto and variations thereupon are within the scope of the following claims.

What is claimed is:

1. A computer-implemented process comprising: trasmiting, by test sites, probes to a network application under test (NAUT);
   generating, by said test sites, raw network-application availability monitoring (NAAM) data, said NAAM data including NAAM datapoints representing probe results of respective ones said probes, each of said NAAM datapoints specifying a network application under test (NAUT), a respective test site that transmitted the respective probe, a time corresponding to a respective probe, and an indication whether the respective probe resulted in a success or a failure;
   transferring said NAAM datapoints from said test sites to NAAM analyzer;
   filtering, by said NAAM analyzer, said NAAM data to remove false-indication NAAM datapoints to yield filtered NAAM data including some of said NAAM datapoints but not including said false-indication NAAM datapoints, said false-indication NAAM datapoints including a NAAM data point determined to represent a test-site failure of one of said test sites rather than a failure of said NAUT; and
   detecting at least one service failure of said NAUT using said filtered NAAM data.

2. A process as recited in claim 1 further comprising organizing said NAAM datapoints of said raw NAAM data into a signature, said filtering including, analyzing said signature to identify sets of NAAM datapoints corresponding to respective probe sequences and to distinguish said NAAM datapoints according to respective step numbers in respective probe sequences of respective probes.

3. A process as recited in claim 2 wherein said filtering involves removing false-indication NAAM datapoints determined to represent probe-sequence step failures.

4. A process as recited in claim 1 wherein said NAAM datapoints do not indicate probe step numbers.

5. A system comprising a network-application availability monitoring (NAAM) computer, said computer including:
   a NAAM data collector to collect raw NAAM data provided by plural test sites, said NAAM data including NAAM datapoints, each of said raw NAAM datapoints specifying a network application under test (NAUT), a respective test site, a time corresponding to a respective probe, and an indication whether the respective probe resulted in a success or a failure;
   a NAAM data filter to filter said raw NAAM data to provide filtered NAAM data at least in part by removing datapoints corresponding to failures associated with said test sites rather than said NAUT; and
   a service-failure detector configured to detect service failures of said NAUT by analyzing said filtered NAAM data.

6. A system as recited claim 5 wherein said NAAM data collector is further configured to arrange said NAAM datapoints to form signatures with chronologically-ordered steps corresponding to respective ones of said NAAM datapoints.

7. A system as recited in claim 6 wherein said NAAM data filter is further to analyze said signature to identify sets of NAAM datapoints corresponding to probe sequence instances and to distinguish raw NAAM datapoints within a set according a step position of a respective probe in the respective probe sequence.

8. A system as recited in claim 5 wherein said computer includes a processor and media encoded with code, said code being to execute on said processor to define said NAAM data collector, said NAAM data filter, and said unavailability detector.

9. A system as recited in claim 5 further comprising plural of said test sites, each of said test sites being to:
transmit probes to said NAUT;
generate said NAAM datapoints based on results of said probes; and
transmit said NAAM datapoints to said NAAM computer.

10. A system comprising non-transitory computer-readable storage media encoded with code to, when executed by a processor, detect, identify and remove from network-application availability monitoring (NAAM) data including NAAM datapoints:
false-indication NAAM datapoints, at least some of which correspond to probes that indicated failures due to failures of test sites that transmitted said probes rather than due to failures of a network application under test (NAUT).

11. A system as recited in claim 10 further comprising said processor.

12. A system as recited in claim 10 wherein the false-indication NAAM datapoints removed from said NAAM data correspond to failures of one or more but not all test sites providing said NAAM data.

13. A system as recited in claim 10 wherein some of the false-indication NAAM datapoints correspond to failures associated with a particular step of a probe sequence, plural instances of which are transmitted by different test sites to said NAUT.

14. A system as recited in claim 10 wherein said code is further to, when executed by said processor, arrange sets of said NAAM datapoints chronologically to form signatures, said filtering including analyzing said signatures to identify instances of probe sequences in said signatures and identify probe sequence steps for respective ones of said NAAM datapoints.

* * * * *